United States Patent [19]

DiBartola et al.

[11] Patent Number: 5,032,200
[45] Date of Patent: Jul. 16, 1991

[54] METHOD OF FORMING A BABY SHOWER DISPLAY DEVICE

[76] Inventors: Joann DiBartola; Lawrence S. DiBartola, both of 520 Coleman Ave., Johnstown, Pa. 15902

[21] Appl. No.: 519,825

[22] Filed: May 7, 1990

[51] Int. Cl.⁵ .............................................. B65H 54/64
[52] U.S. Cl. .................................... 156/156; 156/172; 156/169; 156/267; 156/63; 428/542.6; D6/390
[58] Field of Search ............... 156/156, 172, 173, 169, 156/186, 267, 63; 434/81, 83, 84, 95, 96; 446/220, 222, 223, 226; 280/31, 47.38; 206/575, 45.19; D6/390; D11/157; D21/84; 428/542.2, 542.6, 36.3, 7

[56] References Cited

U.S. PATENT DOCUMENTS

| D. 234,380 | 2/1975 | Verlet | D6/390 |
|---|---|---|---|
| 743,570 | 11/1903 | Savage | 446/226 X |
| 1,741,014 | 12/1929 | Debelack | D6/390 X |
| 1,762,680 | 6/1930 | Debelack | 280/31 |
| 2,014,426 | 9/1935 | Dorogi | 446/220 |
| 3,100,171 | 8/1963 | Hardesty | 156/173 X |
| 3,533,869 | 10/1970 | Ikeda et al. | 156/173 X |
| 4,006,540 | 2/1977 | Lemelson | 434/83 |
| 4,083,740 | 4/1978 | Hamanska | 206/575 X |
| 4,144,632 | 3/1979 | Stroupe | 156/165 X |

Primary Examiner—Caleb Weston
Assistant Examiner—Jeff H. Aftergut
Attorney, Agent, or Firm—Leon Gilden

[57] ABSTRACT

A method including the steps of providing a balloon and inflating the balloon from a pressurized source. Subsequently the balloon is formed with a knot adjacent its nozzle. The balloon is then subject to a step of completely encasing the balloon with a fibrous yarn. The yarn is then coated with a liquid glue adhesive and dried to provide a rigid housing. The balloon is then punctured and removed from within the housing. The housing is of a generally elliptical cross-sectional configuration defined by a major and minor axis wherein a first cut is directed along a major axis of the housing and a second cut is directed orthogonally relative to the first cut about a minor axis of the elliptical cross-sectional housing to define first and second edges and to define a quadrant of the housing that is removed and discarded. The remaining housing is defined by an interior cavity and the cavity is lined with a suitable lining and lace is directed about the first and second edges defined by the first and second cuts wherein the thusly lined cavity is available for reception of various baby shower cards and the like in simulating a baby carriage for association with a baby shower commemorating a birth event.

4 Claims, 4 Drawing Sheets

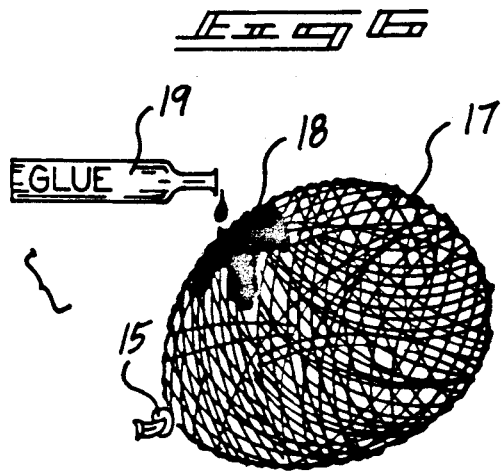
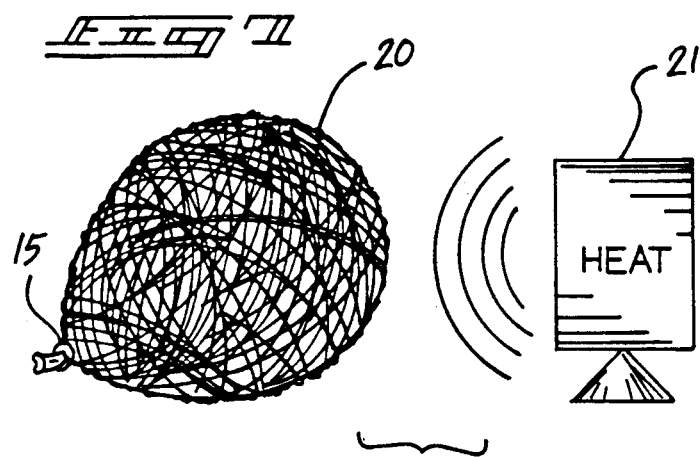
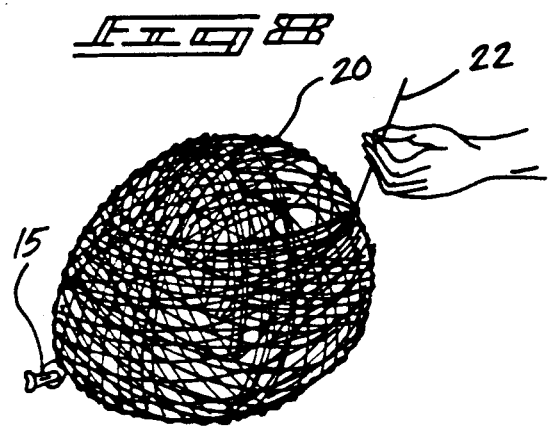

METHOD OF FORMING A BABY SHOWER DISPLAY DEVICE

BACKGROUND OF THE INVENTION

1. Field of the invention

The field of the invention relates to display devices, and more particularly pertains to a new and improved method of forming a baby shower display device wherein the same is directed to readily and efficiently producing a baby shower display member.

2. Description of the Prior Art

Various display devices for commemorating and enhancing festive occasions are provided in the prior art as a visual enhancement to festivities typically employed in the commemoration of various events such as weddings, births, and the like. Such display devices are typically of a unique and individualized construction for use in such events and in this regard, their availability is frequently limited.

To overcome this situation, a method of forming a baby shower device is set forth to provide a unique and festive organization for use in a baby shower scenario. Examples of display devices may be found in U.S. Pat. No. 2,780,017 to PAIGE wherein a generally heart shaped device is provided to receive and position a gift of various sorts therewithin.

U.S. Pat. No. 2,917,856 to SOLOFF sets forth a plastic block to house and display various components therewithin.

U.S. Pat. No. 3,800,442 to PETROCELLI sets forth a sculpture device permitting articulation of various components of the device relative to one another to permit changing of the configuration for ornamental purposes.

U.S. Pat. No. 1,741,014 to DEBLACK sets forth a baby carriage indicative in characteristic of an infant.

U.S. Pat. No. Des. 136,335 to CUTRONE sets forth a bassinet structure for decorative purposes.

As such, it may be appreciated that there continues to be a need for a new and improved method of forming a baby shower display device wherein the same addresses both the problems of ease of assemblage as well as effectiveness in the presentation and display of various baby shower components and in this respect, the present invention substantially fulfills this need.

SUMMARY OF THE INVENTION

In view of the foregoing disadvantages inherent in the known types of display devices present in the prior art, the present invention provides a new and improved method of forming a baby shower display device wherein the same sets forth a method for creating a baby carriage simulation for securement of various cards and presents associated with a baby shower. As such, the general purpose of the present invention, which will be described subsequently in greater detail, is to provide a new and improved method of forming a baby shower display device which has all the advantages of the prior art display organizations and none of the disadvantages.

To attain this, the method of forming a baby shower display device of the instant invention includes a method including the steps of providing a balloon and inflating the balloon from a pressurized source. Subsequently the balloon is formed with a knot adjacent its nozzle. The balloon is then subject to a step of completely encasing the balloon with a fibrous yarn. The yarn is then coated with a liquid glue adhesive and dried to provide a rigid housing. The balloon is then punctured and removed from within the housing. The housing is of a generally elliptical cross-sectional configuration defined by a major and minor axis wherein a first cut is directed along a major axis of the housing and a second cut is directed orthogonally relative to the first cut about a minor axis of the elliptical cross-sectional housing to define first and second edges and to define a quadrant of the housing that is removed and discarded. The remaining housing is defined by an interior cavity and the cavity is lined with a suitable lining and lace is directed about the first and second edges defined by the first and second cuts wherein the thusly lined cavity is available for reception of various baby shower cards and the like in simulating a baby carriage for association with a baby shower commemorating a birth event.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved method of forming a baby shower display device which has all the advantages of the prior art display devices and none of the disadvantages.

It is another object of the present invention to provide a new and improved method of forming a baby shower display device which may be easily and efficiently manufactured and marketed.

It is a further object of the present invention to provide a new and improved method of forming a baby shower display device which is of a durable and reliable construction.

An even further object of the present invention is to provide a new and improved method of forming a baby shower display device which is susceptible of a low cost of manufacture with regard to both materials and labor, and which accordingly is then susceptible of low prices of sale to the consuming public, thereby making such method of forming a baby shower display devices economically available to the buying public.

Still yet another object of the present invention is to provide a new and improved method of forming a baby shower display device which provides in the apparatuses and methods of the prior art some of the advantages thereof, while simultaneously overcoming some of the disadvantages normally associated therewith.

Still another object of the present invention is to provide a new and improved method of forming a baby shower display device which may be compactly stored when not being utilized.

Yet another object of the present invention is to provide a new and improved method of forming a baby shower display device wherein the same easily and conveniently permits production of a baby shower display device for support and securement of various presents and baby shower components therewithin.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 6 is an isometric illustration of the instant invention illustrating the application of an adhesive liquid glue about the encased balloon.

FIG. 7 is an orthographic side view taken in elevation of the glue saturated yarn during a drying procedure.

FIG. 8 is an isometric illustration of the instant invention setting forth the puncturing of the balloon.

DESCRIPTION OF THE PREFERRED EMBODIMENT

Figure 1:
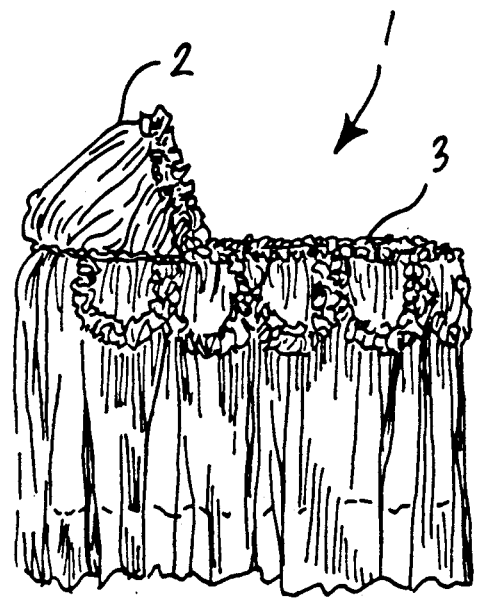
FIG. 1 is an orthographic view taken in elevation of a prior art baby support structure.

With reference now to the drawings, and in particular to FIGS. 1 to 11 thereof, a new and improved method of forming a baby shower display device embodying the principles and concepts of the present invention and generally designated by the reference numerals 11 through 32 will be described.

Figure 2:
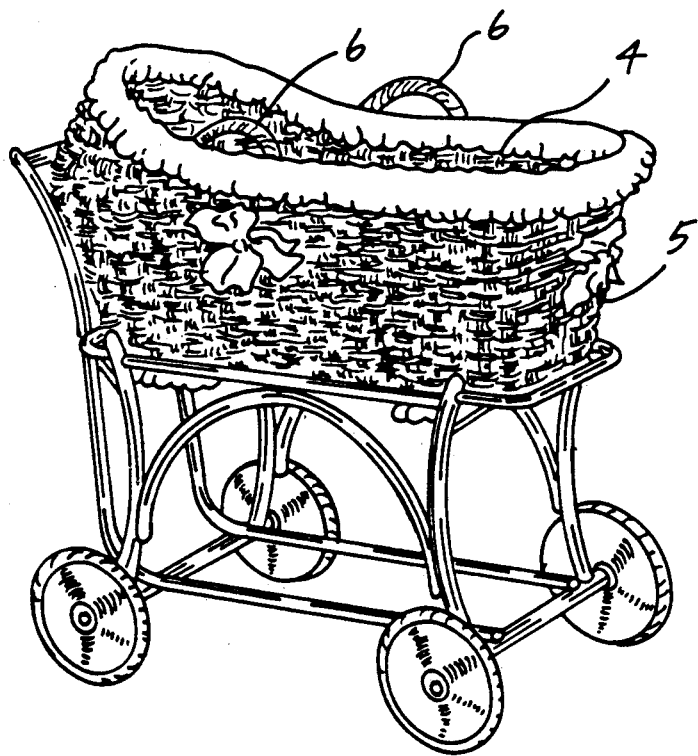
FIG. 2 is an isometric illustration of a prior art baby carriage.
Figure 3:
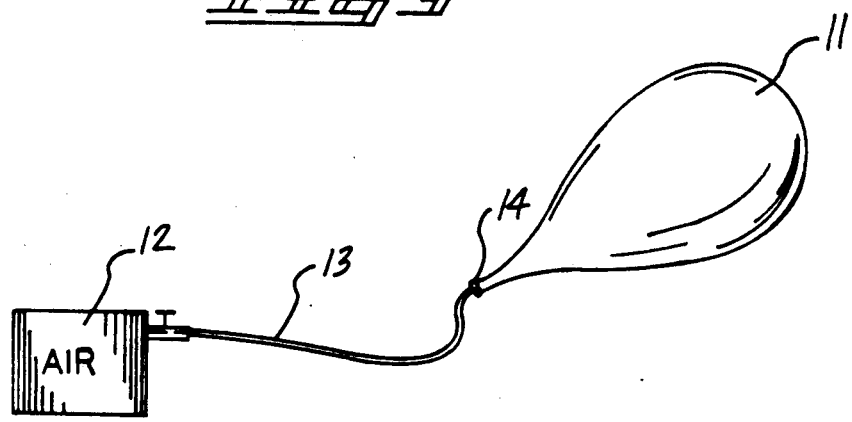
FIG. 3 is an orthographic view taken in elevation of a step of the instant invention involving the inflation of an associated balloon.
Figure 4:
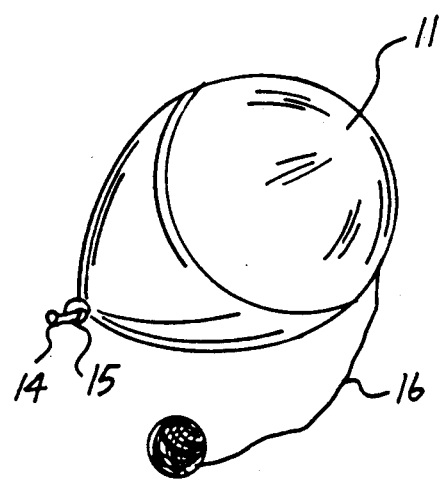
FIG. 4 is an isometric illustration of a further step of the instant invention illustrating initial encasement of the balloon by associated yarn structure.
Figure 5:
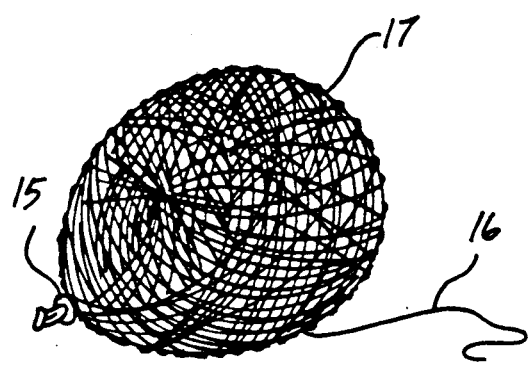
FIG. 5 is an isometric illustration of the balloon completely encased by the yarn.

FIG. 1 illustrates a prior art baby bassinet structure 1 utilizing a support housing 3 and a canopy 2 positioned adjacent a forward end of the support structure. FIG. 2 illustrates a baby carriage organization wherein a basket member 4 is provided with handles 5 and various adornments such as ribbons and the like.

More specifically, the method of forming a baby shower display device as set forth by the instant invention essentially comprises the steps of providing an inflatable balloon 11 formed with a balloon nozzle 14 of a generally elliptical configuration when inflated.

Figure 9:
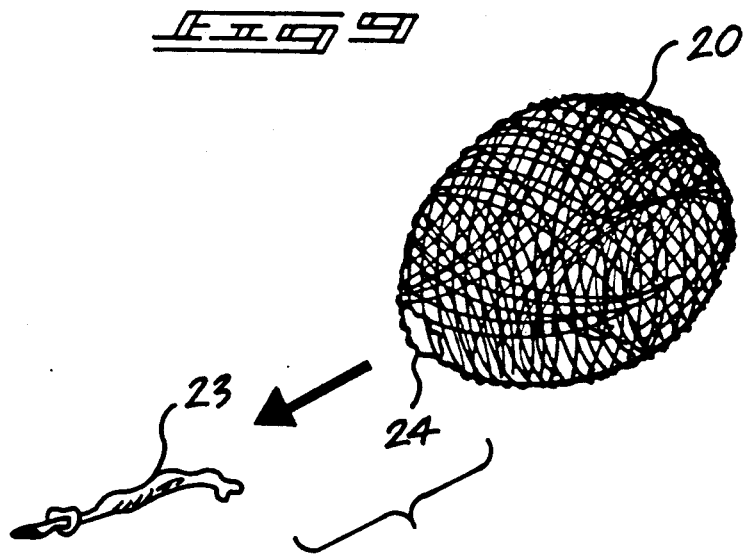
FIG. 9 is an isometric illustration of the instant invention illustrating a removal of the balloon from the housing.
Figure 10:
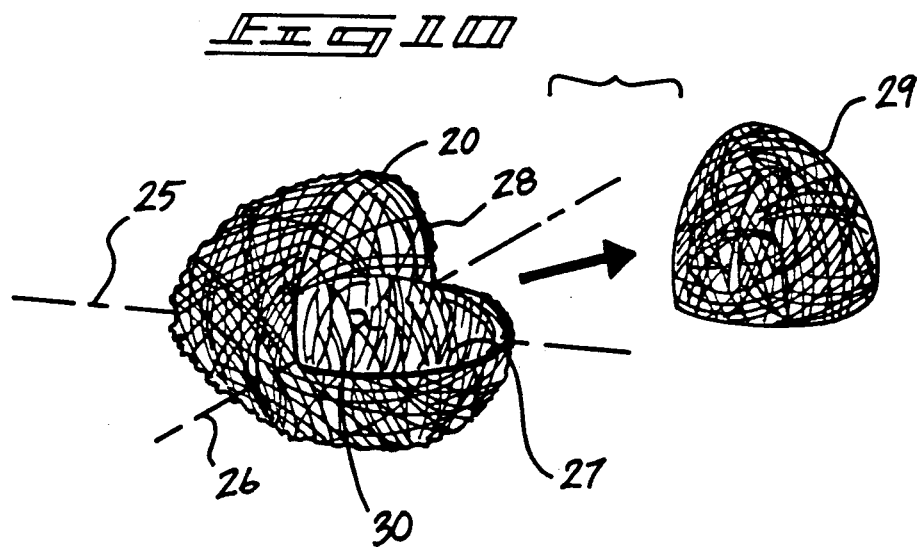
FIG. 10 is an isometric illustration of the instant invention setting forth a step of removing a quadrant from the housing.
Figure 11:
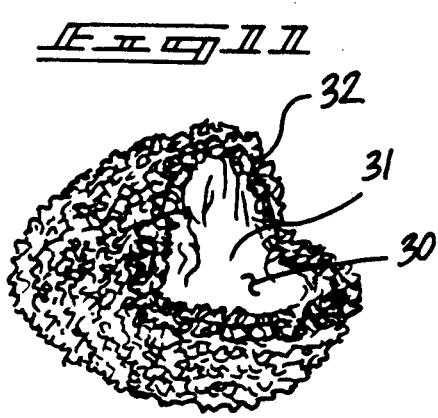
FIG. 11 is an isometric illustration of the final product illustrating the interior cavity of the housing lined with a suitable lining material as well as suitable adornment of the free edges of the device by a lace material.

A pressurized air supply 12 utilizes a conduit 13 to direct a supply of pressurized air through the hose 13 into the balloon 11 to inflate the balloon to a generally elliptical cross-sectional configuration. Upon inflation, a knot 15 is formed about the balloon nozzle 14 to prevent escape of air from the balloon. A fibrous supply of yarn 16 is wound about the complete surface of the inflated balloon to completely encase the balloon to define a yarn casing 17 formed about the balloon up to the knot 15. A liquid glue or other suitable adhesive 18 is directed from a liquid glue reservoir 19 onto the glue encased yarn casing 17 as illustrated in FIG. 6 and upon application of drying of the glue utilizing a heat source 21 to enhance and accelerate the drying process, a glue encased housing 20 is formed upon curing of the glue. Subsequently, a pin 22 is directed into the balloon 11 to deflate the balloon, and is illustrated in FIG. 9, the deflated balloon 23 is removed from interiorly of the housing 20 through a housing opening 24 that it is aligned with the major axis of the cross-sectional elliptical configuration of the housing 20.

Subsequently, a first cut 27 is directed in alignment with the major axis 25 of the housing 20 and is directed interiorly along the major axis a distance substantially equal to one half of a major axis length defined by the housing 20. A second cut 28 is directed orthogonally relative to the first cut along a minor axis of and orthogonally oriented elliptical cross-sectional configuration of the housing 20 to define a first semi-elliptical edge directed along the first cut 27 and a second semi-elliptical edge directed along the second cut 28. A quadrant 29 is thereby separated from the housing 20 and is removed and discarded. A cavity 30 is accordingly accessible subsequent to the removal of the quadrant 20 whereupon a fabric lining 31 is formed interiorly of the housing 20 within the cavity 30 and a lace 32 is formed about the first and second semi-elliptical edges defined by the first and second cuts. The cavity 30 is then arranged to receive a variety of baby shower type cards and gifts within the cavity 30.

As to the manner of usage and operation of the instant invention, the same should be apparent from the above disclosure and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling withing the scope of the invention.

What is claimed as being new and desired to be protected by Letters Patent of the United States is as follows:

1. A method of forming a baby shower display device comprising the steps of providing an inflatable balloon, and inflating the balloon to an elliptical cross-sectional configuration, and securing the balloon to prevent escape of air from within the balloon utilized to inflate the balloon, and encasing the balloon subsequent to inflation with a fibrous yarn, applying a liquid glue about the yarn, and drying the liquid glue and the yarn to define a glue encased housing, and removing a quadrant of the housing to provide access to a cavity within the housing.

2. A method of forming a baby shower display device as set forth in claim 1 wherein the step of removing a quadrant from the housing includes the steps of directing a first cut along a major axis of the housing defining a semi-elliptical cross-sectional configuration and directing the first cut along one half of a major axis length defined along the major axis, and directing a second cut along a minor axis of an elliptical cross-sectional configuration of the housing wherein the minor axis is arranged orthogonally relative to the major axis to define a quadrant, and disposing of the quadrant once removed from the housing.

3. A method of forming a baby shower display device as set forth in claim 2 further including the step of puncturing the balloon prior to directing the first and second cuts into the housing, and effecting deflation of the balloon upon puncturing the balloon, and removing the deflated balloon from the housing.

4. A method of forming a baby shower display device as set forth in claim 3 further including a step of imparting and securing a fabric lining interiorly of the cavity subsequent to removal of the quadrant, and further mounting a fabric lace onto the housing onto respective first and second edges defined by the first and second cuts directed into the housing to define a lace entrance into the cavity of the housing.

* * * * *